United States Patent
Staines

[15] 3,683,606
[45] Aug. 15, 1972

[54] BLADE ASSEMBLY FOR ROTARY LAWN MOWER

[72] Inventor: Harvey C. Staines, R.R. 6, Box 1059, Battle Creek, Mich. 49017

[22] Filed: Nov. 12, 1970

[21] Appl. No.: 88,753

[52] U.S. Cl. ................................................56/295
[51] Int. Cl. .............................................A01d 55/18
[58] Field of Search................................56/295, 255

[56] References Cited

UNITED STATES PATENTS

| | | | |
|---|---|---|---|
| 2,232,261 | 2/1941 | Orr | 56/255 |
| 2,477,442 | 7/1949 | Cramer, Jr. et al. | 56/295 X |
| 3,321,894 | 5/1967 | Ingram | 56/295 |

Primary Examiner—Louis G. Mancene
Assistant Examiner—J. N. Eskovitz
Attorney—Roy A. Plant

[57] ABSTRACT

An arm and blade assembly for a rotary lawn mower is provided comprising an arm member defining a pair of arms, and a pair of blades, one affixed at the end of each arm, the blades being affixed to the arms by means of a keystone or dovetail joint providing restriction with respect to longitudinal and lateral movement, and a sleeve disposed over the joint providing restriction with regard to vertical movement, thereby providing a safe and positive means for readily affixing and detaching the blades to and from the arms.

9 Claims, 7 Drawing Figures

Patented Aug. 15, 1972
3,683,606
2 Sheets-Sheet 1
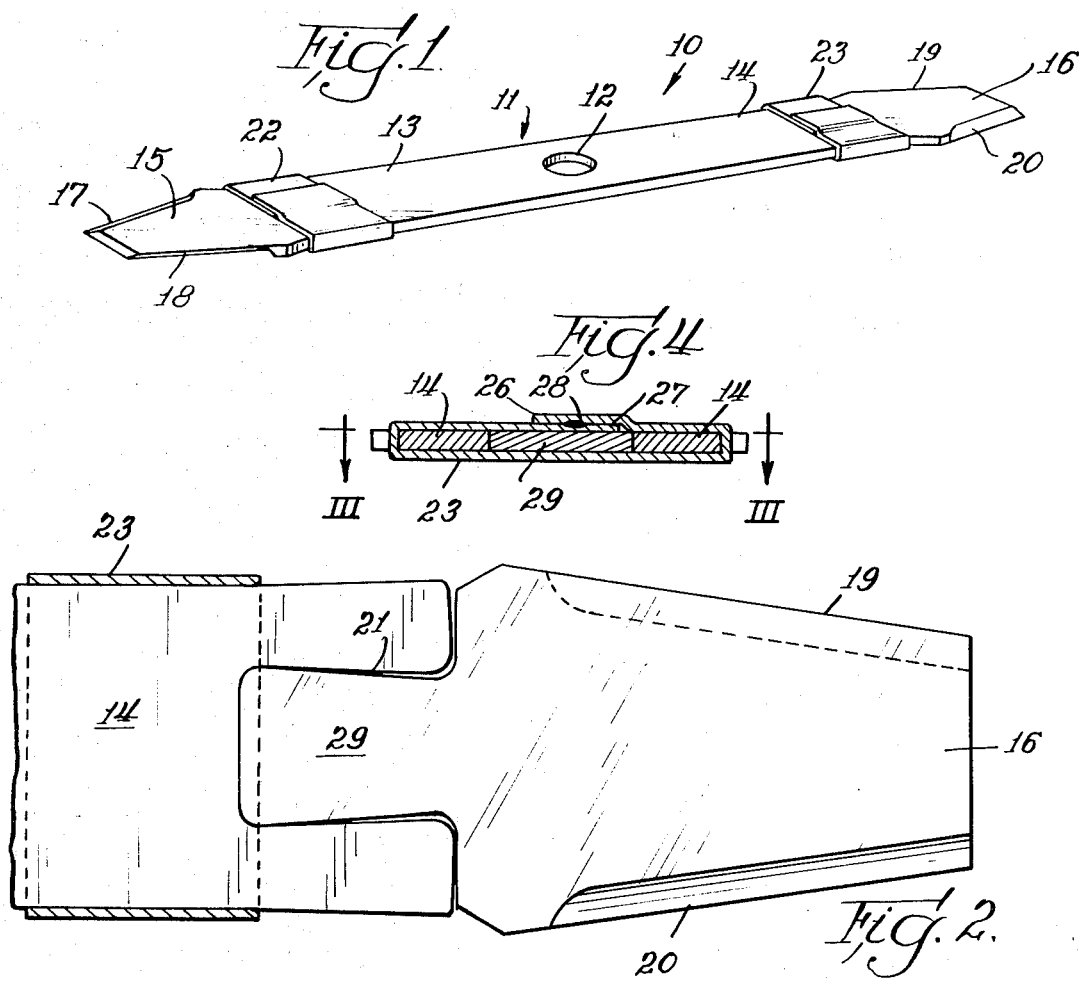
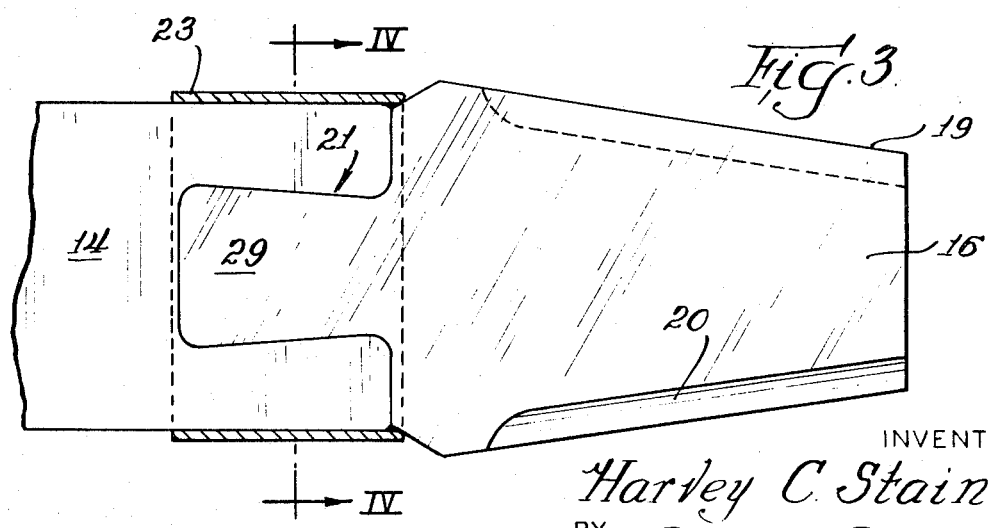
INVENTOR
Harvey C. Staines
BY Roy A. Plant
ATTORNEY

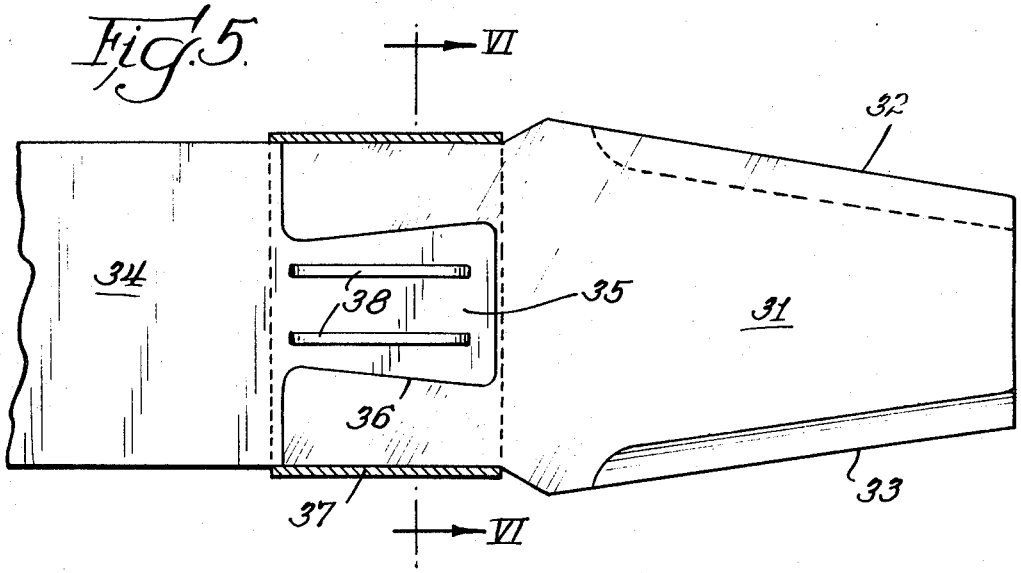
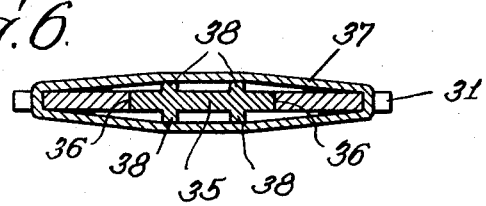
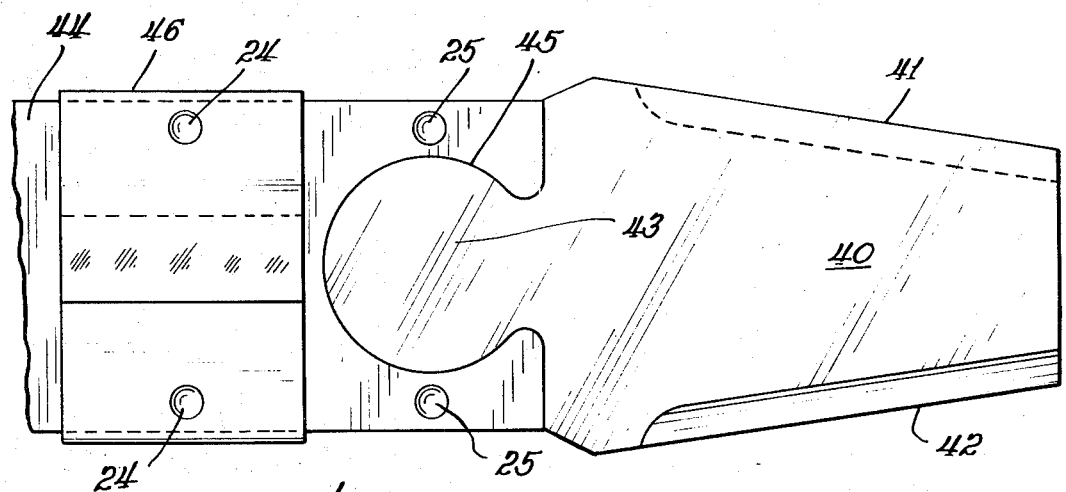

BLADE ASSEMBLY FOR ROTARY LAWN MOWER

BACKGROUND OF THE INVENTION

The present invention deals broadly with lawn mower blades, and is more particularly concerned with an arm and blade assembly for a rotary motor which is relatively inexpensive to produce, which is easy to fabricate, wherein blades may be readily mounted and dismounted, and which is yet safe in operation.

Rotary-tape lawn mowers have become extremely popular because of the many advantages they offer. They are simple to operate, they can be utilized to cut to the edge of a lawn and therefore obviate the need for subsequent trimming, and are relatively inexpensive to build. Moreover, the blades may be readily removed for sharpening and quickly replaced. However, because of the extremely high speeds at which the blades rotate, special care must be utilized in their design to insure that the blades are securely held by the rotating arm even when they accidentally strike a hard stationary object.

SUMMARY OF THE INVENTION

It is an object of the present invention to provide an arm and blade assembly for a rotary lawn mower which provides efficient cutting operation.

It is still further an object to provide an improved means whereby the blades are readily affixed to the ends of the arms, and readily so maintained during use.

It is an additional object to provide an assembly of the type described wherein the blades may be readily detached from the supporting arms for sharpening, and readily remounted.

It is still further an object to provide an assembly of the type described which is relatively simple and inexpensive to manufacture.

Still further objects and advantages of the invention will appear as the description proceeds.

To the accomplishment of the foregoing and related ends, the invention, then, consists of an arm and blade assembly for a rotary lawn mower, as herein fully described and particularly pointed out in the claims, the annexed drawings and the following description setting forth in detail certain illustrative embodiments of the invention, such disclosed embodiments illustrating, however, but several of the various ways in which the present invention may be used.

BRIEF DESCRIPTION OF THE DRAWINGS

In the annexed drawings:

FIG. 1 is a perspective view of an arm and blade assembly according to the present invention.

FIG. 2 is a fragmentary top view showing the joint formed between a blade and the end of an arm before a sleeve is placed thereover for locking in place.

FIG. 3 is a fragmentary view, partially in cross-section, taken at the line III—III of FIG. 4, looking in the direction of the arrows, and showing the sleeve of the assembly in place.

FIG. 4 is a cross-sectional view taken at the line IV—IV of FIG. 3, looking in the direction of the arrows.

FIG. 5 is a view partially in cross-section of another embodiment of the invention.

FIG. 6 is a cross-sectional view taken at the line VI—VI of FIG. 5, looking in the direction of the arrows.

FIG. 7 is a fragmentary top view of still another embodiment of the invention.

DESCRIPTION OF THE SPECIFIC EMBODIMENTS

FIG. 1 illustrates an arm and blade assembly 10 having an arm member 11 provided with a mounting hole 12 for affixing the blade to a motor shaft. The arm member 11 has a pair of arms 13 and 14 to which blades 15 and 16 having cutting edges 17, 18, 19 and 20 are affixed.

Referring more particularly to FIGS. 2–4, the means by which the blades 15 and 16 are affixed to the arms 13 and 14 is shown in detail, and comprises a keystone or dovetail tongue 29 provided as an extension of the blade and a complementary slot 21 provided at the end of the arm 14. The tongue 29 and slot 21 are so arranged that both longitudinal and lateral relative movement between the blade 16 and arm 14 are restricted. In order to restrict vertical movement, sleeves 22 and 23 are slidably mounted on the arm, and as shown in FIGS. 1, 3 and 4, are slidably moved until they cover the dovetail joint between the tongue 29 and slot 21, the knife blade 16 now being completely and positively affixed to the end of the arm 14. The sleeves 22 and 23 are so dimensioned that they provide a tight fit over the tongue to prevent slipping. Additionally, the centrifugal force resulting from rotation of the arm member 11 maintains the sleeve in locked position. If desired, as shown in FIG. 7, detent means may be provided in the form of dimples 24 and complementary detent depressions 25, which detent means cooperate to prevent the sleeve from slipping once it has been applied in place. If desired, the sleeves 22 and 23 can be manufactured from a single strip of metal, as shown in FIG. 4, with the free edges 26 and 27 affixed together by means of a weld 28. As a safety measure the width of the blade 16 in the vicinity of the end where it engages the ends of the arm 14 should be greater than the inner width of the sleeve 23, thereby insuring that the sleeve cannot be thrown off by the centrifugal force which develops due to rotation of the arm member 11.

Although in the preferred form of the invention, the tongue 20 is an integral extension of the blade 16, the relationship can be reversed, as shown in FIGS. 5 and 6. In this embodiment the blade 31 comprises cutting edges 32 and 33 similar to those of the embodiment previously shown and described. However, here the arm 34 is provided with a tongue 35 as an extension thereof, and the blade 33 is provided with a complementary slot 36. The operation, however, is substantially the same as in the previous embodiment, with the sleeve 37 placed over the tongue and slot combination to affix the blade and arm together with respect to relative movement in all directions. Additionally, as shown in FIGS. 5 and 6, the tongue 35 is provided with ribs 38 to prevent the sleeve 37 from sticking to the tube 37 as a result of corrosion. Alternatively the blades, arm members or sleeves may be anodized or otherwise treated to prevent sticking of the various parts to each other due to corrosion.

Although the tongue and slot combination has been shown in the embodiments above in the form of a keystone or dovetail joint, other suitable shapes may be utilized. FIG. 7 illustrates an embodiment comprising a blade 40 having cutting edges 41 and 42 and a tongue 43 which is curvilinear in this case. The arm 44 is provided with a complementary slot 45 engaging the tongue 43. The assembly is completed by a sleeve 46 which may be slid over the tongue 43 to maintain it in place.

In addition to the several forms which the tongue may take, as illustrated and described, various other forms may be used, as for example, T-shaped, heart-shaped, diamond-shaped, and any of a large variety of shapes. It is only necessary that for the purpose of providing both lateral and longitudinal restraint, the complementary member be provided with a slot so that the tongue be substantially surrounded, and additionally, that a portion of the tongue distal with respect to its attachment to the member to which it is connected be wider than a portion which is proximal thereto.

The lawn mower arm and blade assembly of the present invention has a number of advantages over the prior art assemblies. First, it is very simple to remove and attach the blades to the arms. Second, a very positive coupling means is provided which is safe to use. Further, the assembly may be very inexpensively and relatively simply produced.

While but only a few forms of the invention have been shown and described, other forms will now be apparent to those skilled in the art. Therefore, the embodiments shown in the drawings are merely for illustrative purposes, and are not intended to limit the spirit and scope of the invention as above described and illustrated in the drawings.

Other modes of applying the principle of my invention may be employed, instead of the ones explained, change being made as regards the apparatus herein disclosed, provided the features stated by any of the following claims or the equivalent of such stated features be employed.

I therefore particularly point out and distinctly claim as my invention:

1. An arm and blade subassembly for a rotary-type lawn mower, comprising an arm member adapted to be mounted on a shaft, a detachable blade having at least one cutting edge, and means for affixing said blade to the end of said arm comprising a tongue extending longitudinally as an integral part of one member of said blade and said arm end and a complementary slot provided in the other of said members, said tongue and slot being shaped to prevent relative longitudinal movement between said arm end and said blade, and a sleeve slidably mounted on said arm and adapted to be placed over said tongue and slot to confine said tongue within said slot, wherein longitudinal ribs are provided on the surface of said tongue to prevent corrosive adhesion to said sleeve.

2. An arm and blade subassembly according to claim 1, wherein said tongue comprises an extension of said blade and said slot is provided in said arm end.

3. An arm and blade subassembly according to claim 1, wherein said tongue comprises an extension of said arm end and said slot is provided in said blade.

4. An arm and blade subassembly according to claim 1, wherein said tongue has a dovetail shape.

5. An arm and blade subassembly according to claim 1, wherein said tongue is curvilinear in shape.

6. An arm and blade subassembly according to claim 1, wherein said blade has two cutting edges and is adapted to be reversed for alternatively presenting each cutting edge in the forward direction of rotation.

7. An arm and blade subassembly according to claim 1, wherein the surfaces of said arm are treated to prevent corrosive adhesion to said sleeve.

8. An arm and blade subassembly according to claim 7, wherein said treatment is anodizing.

9. A detachable blade having at least one cutting edge and adapted to be mounted at the end of a rotatable arm of a rotary lawn mower, and means for affixing said blade to the end of said arm comprising a tongue extending as an integral part of one member of said blade and said arm end, and a complementary slot provided at the end of the other member, said tongue and slot being shaped to prevent relative longitudinal movement between said arm end and said blade, a sleeve slidably mounted on said arm and adapted to be placed over said tongue when engaged in said slot, thereby confining said tongue within said slot, wherein said tongue is provided with longitudinal ribs to prevent corrosive adhesion of said tongue to said sleeve.

* * * * *

PO-1050
(5/69)

UNITED STATES PATENT OFFICE
CERTIFICATE OF CORRECTION

Patent No. 3,683,606          Dated August 15, 1972

Inventor(s) Harvey C. Staines

It is certified that error appears in the above-identified patent and that said Letters Patent are hereby corrected as shown below:

Column 1, line 11, for "Rotary-tape" read --Rotary-type--.

Signed and sealed this 29th day of May 1973.

(SEAL)
Attest:

EDWARD M. FLETCHER, JR.          ROBERT GOTTSCHALK
Attesting Officer                Commissioner of Patents